United States Patent [19]

White et al.

[11] Patent Number: 4,656,751

[45] Date of Patent: Apr. 14, 1987

[54] MAGNETIC COMPASS

[75] Inventors: W. Gordon White, Dover; William N. Anastos, Belmont, both of Mass.

[73] Assignee: Rule Industries, Inc., Gloucester, Mass.

[21] Appl. No.: 774,416

[22] Filed: Sep. 10, 1985

[51] Int. Cl.[4] .............................................. G01C 17/38
[52] U.S. Cl. ........................................ 33/358; 33/356
[58] Field of Search ..................... 33/355 R, 356, 357, 33/358, 359, 364

[56] References Cited

U.S. PATENT DOCUMENTS

| | | | |
|---|---|---|---|
| 1,922,864 | 8/1933 | Rhea | 33/358 |
| 1,925,863 | 9/1933 | Crocker | 33/358 |
| 1,982,405 | 11/1934 | Titterington | 33/357 |
| 1,987,624 | 1/1935 | Jones | 33/358 |
| 1,990,940 | 2/1935 | Hand | 33/358 |
| 2,020,905 | 11/1935 | Robert | 33/358 |
| 2,155,712 | 4/1939 | Hull | 33/358 |
| 3,261,103 | 7/1966 | Bosland et al. | 33/359 |
| 3,334,420 | 8/1967 | Stockton | 33/356 |
| 3,481,045 | 12/1969 | White | 33/358 |
| 3,732,560 | 5/1973 | Harden et al. | 340/373 |
| 3,832,787 | 9/1974 | Fowler | 33/358 |
| 3,949,483 | 4/1976 | White | 33/364 |
| 4,217,625 | 8/1980 | Klein | 362/30 |
| 4,359,823 | 11/1982 | White | 33/364 |

FOREIGN PATENT DOCUMENTS

610657  9/1926  France ............................. 33/358

Primary Examiner—Willis Little

[57] ABSTRACT

A magnetic compass comprises: a gimbal mounted direct read card supported on a bearing in the equatorial plane of the compass in a compass bowl; and a housing having a base to which the compass bowl and corrector magnets are mounted; the corrector magnets being positioned above the base beside the bowl for access without moving the compass; means for supporting the corrector magnets located on three axes, one axis parallel to the lubber line and the equatorial plane of the compass in a horizontal orientation of the housing, a second normal to the lubber line and parallel to the equatorial plane and a third normal to the equatorial plane in a horizontal orientation of the housing and parallel to the lubber line and the equatorial plane in a vertical orientation of the housing; said corrector magnets mounted on two of said axes, said second axis and the one of said first and third axes parallel to said lubber line in the horizontal or vertical orientation selected for mounting said compass; the compass card assembly and the compass card extending below the equatorial plane at its periphery and having a mass therebelow at least as great as the mass above the plane and the housing positioned above the equatorial plane on one side below the equatorial plane on the other side for viewing the compass card at and below the equatorial plane; and light emitting diodes being provided within the housing on the one side for lighting the card and a non-magnetic battery power source being provided in the housing for powering the light emitting diodes.

34 Claims, 14 Drawing Figures

MAGNETIC COMPASS

This invention relates to magnetic compasses used for navigation.

Gimbal mounted magnetic navigational compasses normally provide for corrector magnets located on two axes, typically below the compass unit, for pedestal mounted compasses, or at the back and side or in an outer ring of the compass unit, for bulkhead mounted compasses. Even though the gimbal mounting would permit orientation of the compass either horizontally or vertically, the provision for corrector magnets and the use of magnets on but two axes restricts the mounting of a particular compass to a single orientation. Further, unless the compass is bracket mounted, the depth of the housing required for the corrector magnets normally dictates that an opening be provided in the mounting surface to receive the compass housing, rendering the corrector magnets inaccessible. Adjustment of the corrector magnets normally requires removal of the compass from its mounted position in order to obtain access to the corrector magnets, thus creating the possibility of introducing error into the correction procedure and the possibility of misalignment of the compass lubber line with the center line of the vehicle when the compass is mounted again after correction.

Gimbal mounted compasses having direct read cards, in which indicia are read from the front of the card, normally have the face of the card above the equator of the compass unit with the pivot for the card above the gimbal pivots at the equator. The direct read card is raised in this manner to permit viewing the card since the housing is normally at or above the equator of the compass unit. This raised position of the pivot results in instability which is overcome by counterweighting. Counterweighting, however, slows response of the compass to changes in direction.

Compasses with direct read cards, in which indicia are read from the front of the card, are normally lighted for night viewing from the back or the top of the compass unit in order to avoid obscuring the front of the card with the light fixture. Such lighting is not wholly satisfactory, however, since the card surface bearing the indicia faces forward, away from the light source. Moreover, the light source is normally wired to the electrical system of the vehicle requiring that the vehicle have an electrical system for night lighting of the compass and requiring connection and disconnection of wiring when the compass is installed or removed, e.g., at the beginning and end of a season or when moved from one vehicle to another.

In general, the invention features a magnetic compass comprising a compass unit and a housing. The compass unit comprises a bowl, a gimbal mount within the bowl and pivotally supported by the gimbal mount, a card assembly comprising a compass card and a magnet.

In one aspect of the invention, the housing comprises a base, a cover removably attached to the base, corrector magnets mounted to the base and means connecting the compass unit to the base, the bowl extending through the cover. In this aspect of the invention, the corrector magnets are supported in the housing above the housing base for access, with the cover removed, without moving the compass.

In another aspect, the compass card is a direct read card supported on a pivot bearing on the gimbal mount. The pivot bearing is preferably positioned on the equatorial plane of the compass and the card extends from above to below the plane, the mass of the card assembly below the plane being at least as great as the mass of the card thereabove. The housing on one side is positioned below the pivot bearing so that the card may be viewed below the bearing and above the housing.

In another aspect of the invention, provision is made for corrector magnets on three axes, one axis parallel to the lubber line and the equatorial axis of the compass in a horizontal orientation of the housing, a second axis normal to the lubber line and parallel to the equatorial plane and a third axis normal to the equatorial plane in a horizontal orientation of the housing and parallel to the lubber line and the equatorial plane in a vertical orientation of the housing. Corrector magnets are positioned on two axes, the second axis and the one of the first and third axes parallel to the lubber line and the equatorial plane in the predetermined horizontal or vertical orientation selected for mounting the housing.

In another aspect, a light source is provided below the equatorial plane of the compass on a side of the housing exposing the bowl and card below the plane for front lighting the direct read card. Preferably, the light source comprises at least one light emitting diode. Preferably, the power source for the light is a portable battery source in the housing comprising at least one carbon battery clad in nonmagnetic material.

In yet another aspect of the invention, the compass bowl has an outwardly extending flange and upper and lower mounting rings, between which the flange is secured, connecting the bowl to the base of the housing, the lower ring extending above the base. One of the rings supports the corrector magnets. On one side the cover and mounting rings are positioned below the equatorial plane of the compass, the flange held by the mounting rings at an angle to position the flange, at that side, below the equatorial plane. A light source is positioned in a recess in the rings, on said one side, adjacent the flange. A recess is provided on the opposite side for optionally locating the light source on the opposite side.

The provision of the corrector magnets above the housing base permits adjustment, with the cover removed, without the need for moving the compass unit from its installed position. The provision of supports for corrector magnets on three axes permits the compass to be utilized in horizontal or vertical orientation. Arranging the housing below the equatorial plane of the compass unit on one side permits a direct read card to be employed with the bearing pivot on the equatorial plane of the compass and further permits front lighting the direct read card. The use of light emitting diodes permits the use of portable batteries within the housing to power the lighting. The positioning of the light source adjacent a flange of the compass bowl aids in diffusing the light.

Other objects, features and advantages of the invention will be apparent to those skilled in the art from the following detailed description of a preferred embodiment thereof taken together with the accompanying drawings, which.

Figure 1:
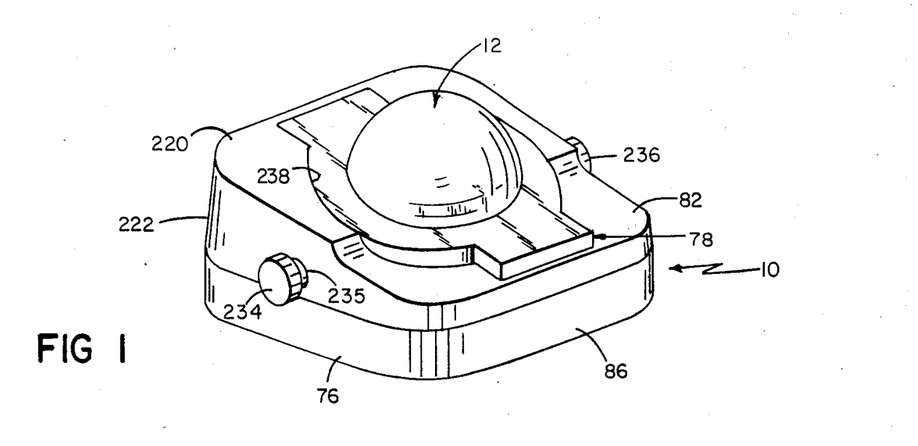
FIG. 1 is an isometric view of an assembled compass unit and housing.

In general, as shown in FIG. 1, the magnetic compass comprises a housing 10 and compass unit 12 supported in the housing.

Figure 2:
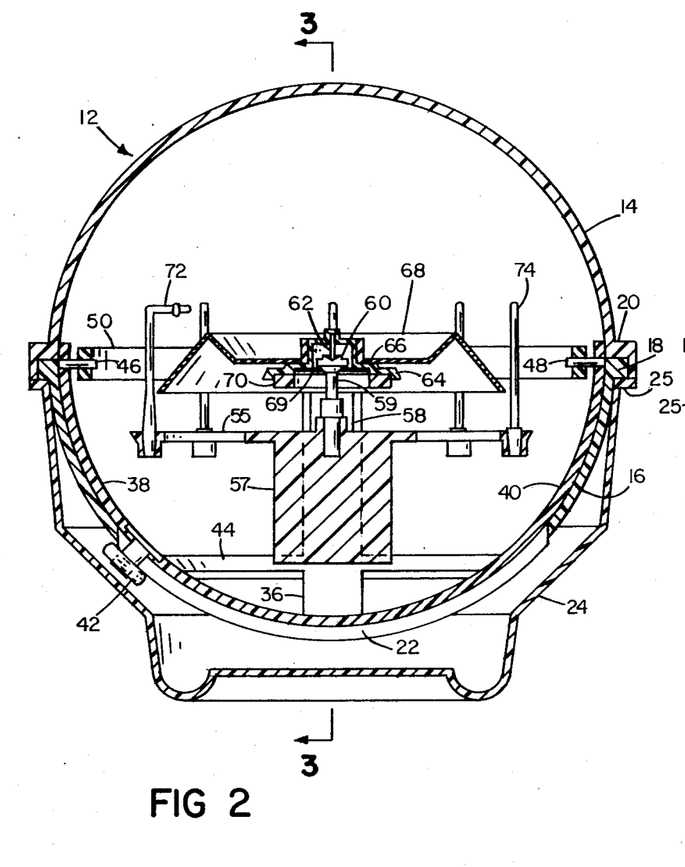
FIG. 2 is an enlarged sectional view of the compass unit along its lubber line and with the flanges of the compass bowl in a horizontal orientation.
Figure 3:
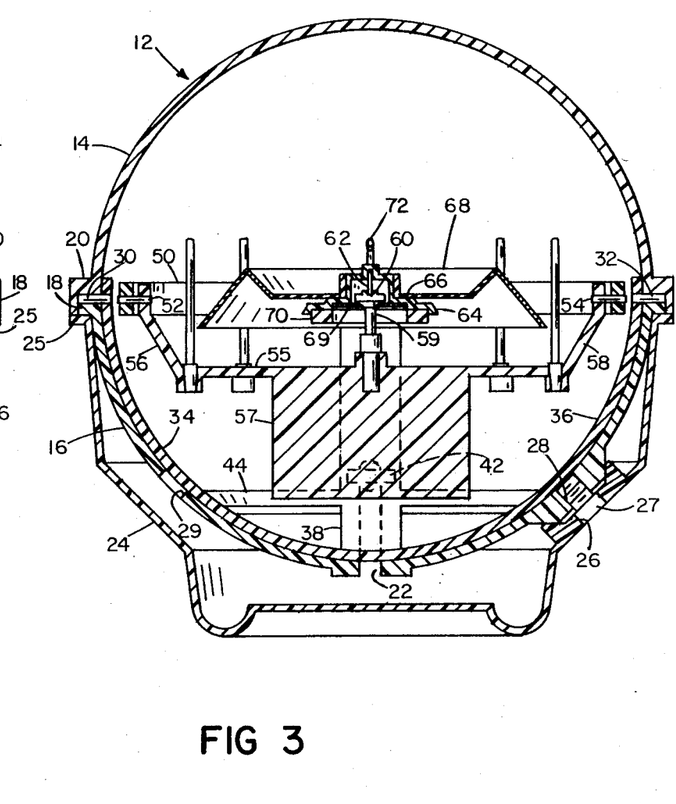
FIG. 3 is a sectional view of the compass unit taken along the line 3—3 of FIG. 2.

As shown in greater detail in FIGS. 2 and 3, the compass unit comprises a spherical bowl in turn comprised of two transparent hemispherical bowl portions 14, 16, made of cellulose acetate propionate, having a flange thereabout. The lower bowl portion 16 has a flange 18 extending outwardly about its periphery. The upper bowl portion 14 also has a flange 20 extending outwardly about its periphery, engaging the facing surface of flange 18, and extending downwardly about and engaging the periphery of flange 18. The lower bowl 16 is provided with an elongated slot 22 along its bottom and is enclosed by a flexible membrane 24, made of neoprene, extending from a flange 25 of membrane material positioned under the lower side of flanges 18, 20. As shown in FIG. 3, membrane 24 has a fill port 26, aligned with and adhesively secured about a port 28 in the lower bowl 16, through which suitable damping liquid can be introduced into the compass unit 12 and air can be evacuated therefrom. Membrane 24 permits expansion and contraction of liquid within the compass, due to temperature and pressure changes, without the formation of bubbles, as is known in the art. Ports 26, 28 are closed by threaded brass fitting 27. Hole 29 in bowl 16 assures unrestricted flow of liquid between the interior of bowls 14, 16 and the exterior space about lower bowl 16 enclosed by membrane 24.

A gimbal mount is provided within the compass bowl. As illustrated in FIG. 3, a pair of pivot pins 30, 32 are captured in diametrically opposed recesses in the flange 18, the flange 20 of the upper bowl overlying the recesses and the pins 30, 32 and enclosing the outer ends of the pins. The pins are rotatably supported within the recesses in flange 18. The pins 30, 32 pivotally support the gimbal cage comprising arms 34, 36, 38, 40. Two arms 34, 36 of the gimbal support extend from pins 30, 32 in semicircular fashion about the bottom of lower bowl 16. At right angles to arms 34, 36, as shown in FIG. 3, the gimbal cage arms 38, 40 extend in a semicircle about the bottom of bowl 16 in line with slot 22. Arm 38 is provided with a friction lock member 42 extending on a shaft, through slot 22, and frictionally engaging the outside of bowl 16 to adjustably position the gimbal cage, as disclosed in U.S. Pat. No. 3,949,483, incorporated by reference herein. The arms 34, 36, 38, 40 of the gimbal cage are interconnected by an integral circular rib 44 extending therebetween below lock member 42 in arm 38. A pair of pivot pins 46, 48, in the same plane as pins 30, 32, pivotally support a gimbal ring 50. Ring 50 extends in a continuous circle about the interior of the compass bowl. The gimbal cage and the gimbal ring are made of rigid transparent plastic material, clear acrylic in a preferred embodiment.

At a right angle to pins 46, 48, in the same plane as pins 30, 32, 46, 48 with the pins 30, 32 in horizontal alignment, as shown in FIG. 3, pivot pins 52, 54 pivotally support gimbal frame 55, depending from arms 56, 58, below the compass equator and below pins 52, 54. An integral damping baffle or weight 57 extends below frame 55. A bearing shaft 59 extends upwardly from frame 55 on the vertical axis of compass supporting a jewel pivot bearing 60 at the equatorial plane of the compass, defined by pins 30, 32, 46, 48, 52, 54 with the axes of pins 30, 32 and 46, 48 in a horizontal position. A pivot shaft 62 is pivotally supported on the bearing 60. An inverted cup member 64 is connected to the upper end of pivot shaft 62 and has a radially extending surface 66 which is preferably closely adjacent or, as illustrated, in the equatorial plane. Supported on the surface 66 is a compass card 68. The direct read card illustrated extends radially outwardly and is then angled a short distance upwardly above the equatorial plane and then downwardly below the equatorial plane. Indicia, not shown, are printed on the outside of the downwardly extending portion of the card 68. An annular magnet 70 of permanent magnetic material is supported below cup member 64, with the North pole thereof at the South pole marked on the card 68. Disc 69, press fitted into a recess on the lower side of member 64, extends under the enlarged bearing 60 to adjacent bearing shaft 59 capturing the card assembly to the bearing shaft. In the illustrated embodiment, the mass of the card assembly, comprising shaft 62, member 64, card 68, disc 69 and magnet 70, below the pivot bearing at the equatorial plane is at least as great as the mass above the bearing. Frame 55 also supports indicator pins including pins 72, 74 defining the lubber line or principal axis of the compass; pins 72, 74 are mounted in line with pivot pins 46, 48, the lubber line being at a right angle to the axis of the other pins 30, 32, 52, 54.

Figure 4:
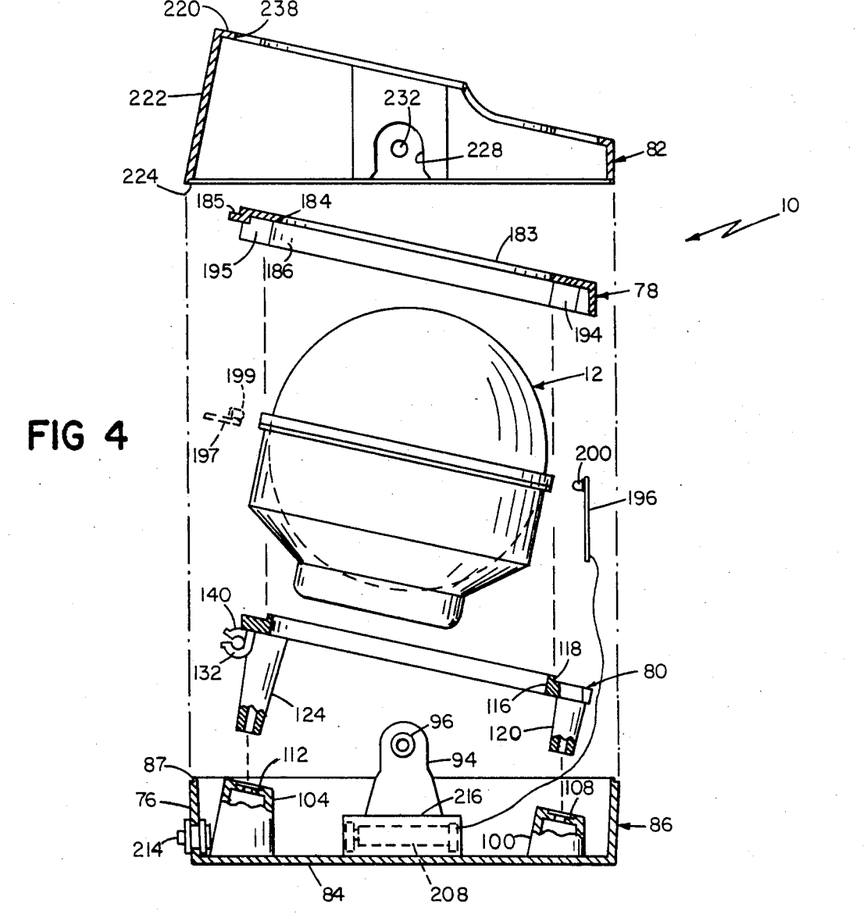
FIG. 4 is an exploded side elevation view, partly in section of the compass.
Figure 5:
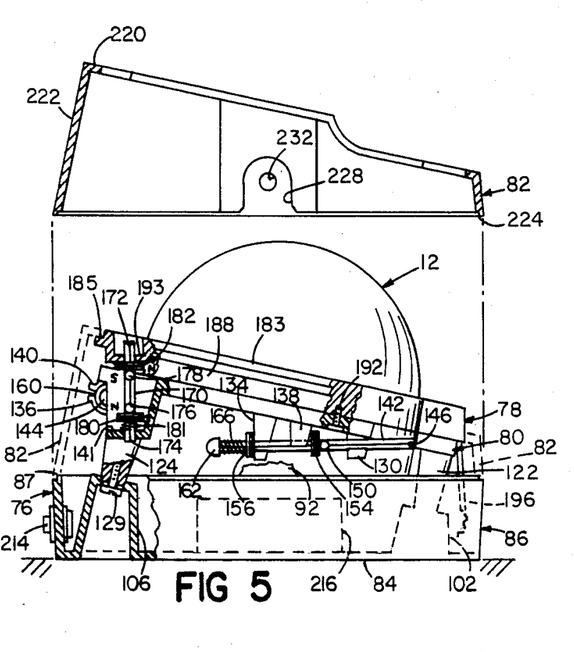
FIG. 5 is a partly exploded, partly sectional side elevation view of the compass with the cover shown above the remainder of the compass and shown in broken lines assembled to the compass.
Figure 6:
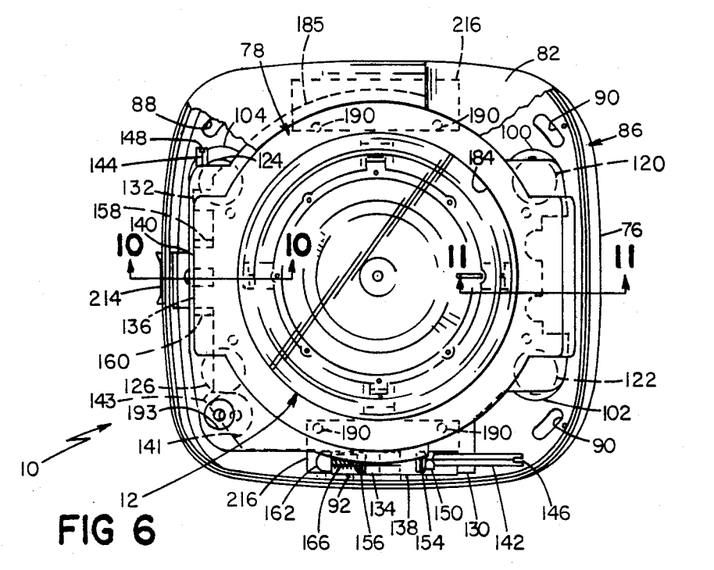
FIG. 6 is a plan view of the compass in the plane of the top cover, with the cover partially broken away.
Figure 7:
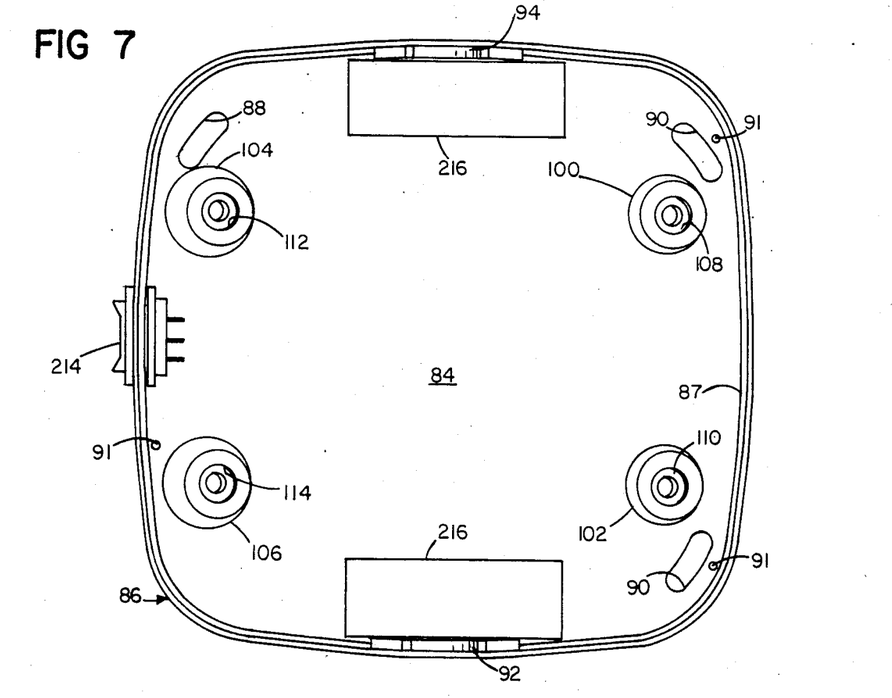
FIG. 7 is an enlarged plan view of the base of the compass housing.

The housing 10 comprises a base 76, upper and lower mounting rings 78, 80 and a cover 82. The base 76, as shown in FIGS. 4, 5, and 7, comprises a bottom wall 84 and a continuous side wall 86 extending above the bottom to an edge parallel to the bottom. The edge of wall 86 is recessed about its outer periphery to provide an upwardly extending lip 87 about the inside of the wall 86. An elongated hole 88 is provided at the rear of the bottom wall 84, and a pair of elongated holes 90 are provided at front of the bottom wall, adjacent the sides thereof. Holes 88, 90 are adapted to receive mounting screws (not shown) for mounting the compass to a surface; the elongated configuration of the holes 88, 90 permits adjustment of the housing position for alignment of the compass lubber line with the vehicle center line. Weep holes 91 are also provided in the bottom to permit drainage of any moisture in the housing. On the sides of bottom wall 84 adjacent, integral with and inside side wall 86, lobes 92, 94 are provided which extend above the side wall 86. Threaded metal collars 96, one of which is shown in FIG. 4, are press fitted in holes in the lobes, the outer portions of the collars being knurled (not shown) to resist rotation. Two pair of support posts 100, 102 and 104, 106, best shown in FIGS. 4 and 7, extend above the bottom wall 84 respectively in the front and back thereof, set inwardly from the sides. Posts 100, 102 and 104, 106 have recessed support surfaces 108, 110 and 112, 114, respectively, on the upper sides thereof, sloping at an acute angle, i.e., 12° in the illustrated embodiment, from the rear toward the front of the base 76, front posts 100, 102 being shorter than rear posts 104, 106. Post support surfaces 108, 110 and 112, 114 have holes extending therethrough.

Figure 8:
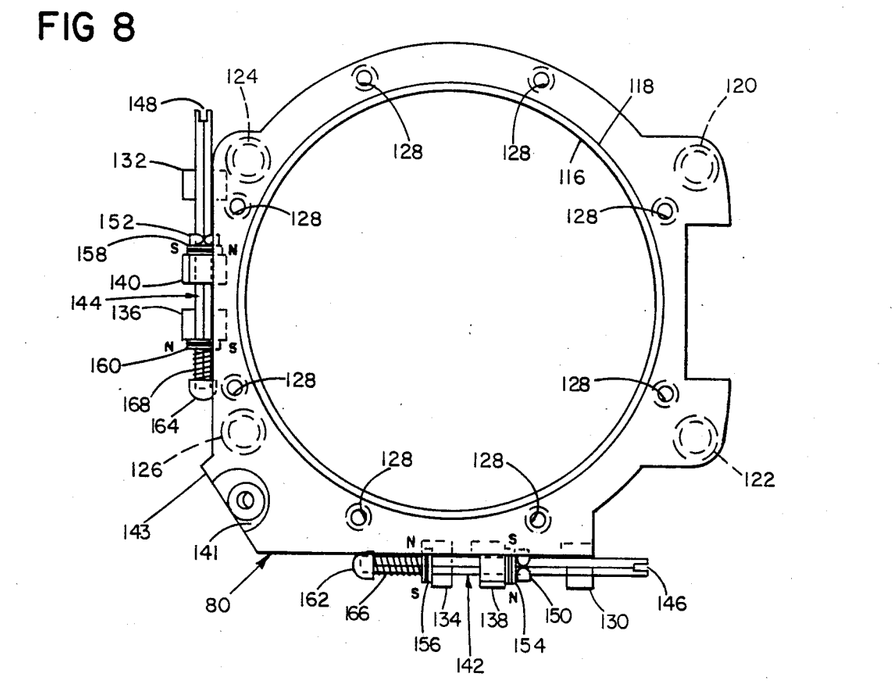
FIG. 8 is an enlarged plan view of the lower mounting ring of the compass housing.

Lower mounting ring 80, best shown in FIGS. 4, 5, and 8, comprises a generally planar member having a central opening 116 with a raised rim 118 thereabout having an inner diameter equal the outer diameter of the compass unit below flanges 18, 20, 25 and having an outer diameter equal to the outer diameter of flanges 20, 25. As shown particularly in FIGS. 10 and 11, the compass unit is supported in the lower mounting ring 80 with membrane flange 25, under flanges 18, 20, resting on rim 118. Extending below lower ring 80 are four legs 120, 122, 124, 126 positioned to mate in the recesses in the respective support surfaces 108, 110, 112, 114 of posts 100, 102, 104, 106. Elongated holes in the bottoms of the legs 120, 122, 124, 126 align with the holes in support surfaces 108, 110, 112, 114 and screws 129 (one is shown in FIG. 5) extended from below the posts, through the holes therein, engage the interior walls of the holes in legs 120, 122, 124, 126 to fasten the lower mounting ring 80 to base 76. Front legs 120, 122 are shorter than rear legs 124, 126, the respective lengths being such that when mounted to posts 100, 102, 104, 106 the plane of ring 80 is inclined at an angle, 12° in the illustrated embodiment, from the rear to the front of base 76 with the bottom 84 of base 76 in a horizontal position. Eight holes 128 are equidistantly spaced about the outside of rim 118, the holes being countersunk from below.

Corrector magnet shaft supports are provided on three axes below the lower mounting ring 80, integral therewith. Two of the corrector shaft supports are located, respectively, on one side and along the rear of the mounting ring, each comprising three arms depending below the mounting ring. The end arms 130, 132 and 134, 136 of each set are in the form of hooks having upwardly facing arcuate surfaces for supporting corrector magnet shafts therein. The center arms 138, 140 of each set have downwardly facing arcuate surfaces for engaging the upper surfaces of corrector magnet shafts, the distance between the opposed arcuate surfaces of the end and center arms being slightly smaller than the largest cross sectional dimension of the corrector magnet shafts in order to tightly grip the shafts and to resist accidental rotation thereof. The axis of the arms 130, 134, 138 along their center line at the side of the mounting ring is inclined downwardly, from front to rear, relative to the plane of the ring, at an angle, 12° in the illustrated embodiment, such that the axis is parallel to the bottom 84 of base 76 and the equatorial plane of the compass when the mounting ring is assembled to the base and the bottom of the base is horizontally oriented. The axis of the arms 130, 134, 138 along the side is also parallel to the lubber line of the compass unit 12 and is positioned above the upper edge of base side wall 86 and slightly below the equator of the compass unit 12 mounted in the bottom ring 80. The axis of the arms 132, 136, 140 along their center line at the rear of the lower mounting ring 80 is at a right angle to the lubber line, parallel to the equatorial plane of the compass; when the ring 84 is mounted to base 76, the axis of the arms 132, 136, 140 is adjacent the equatorial plane of the compass unit 12.

A third magnet shaft support in the lower ring comprises a cup shaped receptacle 141 equidistantly spaced, i.e., at 45° in the illustrated embodiment, from the lubber line and the transverse axis of the compass extending through the pivot of the compass at a right angle to the lubber line. Receptacle 141 is positioned between the sets of arms 130, 134, 138 and 132, 136, 140. The bottom of the receptacle is inclined rearwardly, i.e., 12° in the illustrated embodiment such that it is horizontal when ring 80 is mounted on base 76 with bottom wall 84 horizontal. A hole in the bottom of the receptacle is adapted to receive the end of a corrector magnet shaft. A portion of the rear wall of the receptacle 141, outwardly of the hole in the bottom thereof, is cut away at 143 to provide access to the interior of the receptacle.

Side and rear corrector magnet shafts 142, 144 are identical. Each comprises a hexagonal shaft, best shown in FIG. 10, having a slot 146, 148, shown in FIG. 8, extending transversly across one end and a transverse cross member or boss 150, 152 near the center. A pair of generally annular magnets 154, 156, 158, 160 having hexagonal holes therein, are slidably mounted on each shaft 142, 144, on the sides of bosses 150, 152 opposite the slot 146, 148. The other end of each shaft 142, 144 is provided with a cap 162, 164 and a spring 166, 168 between the cap and the magnet thereadjacent. The shafts 142, 144, in use are respectively mounted, parallel to the equatorial plane of the bowl of the compass unit 12, with the bottom 84 of base 76 oriented horizontally, and are secured in the side and rear sets of arms 130, 134, 138 and 132, 136, 140 with one magnet 156, 160 on the side of end arms 134, 136 away from the other arms of the set and biased thereagainst by spring 166, 168. The other magnet 154, 158 on each shaft is positioned between the boss 150, 152 and the side of center arm 138, 140 away from end arm 134, 136. The North poles of each pair of magnets are located on opposite sides of the shaft on which they are positioned, as shown in FIG. 8.

The corrector magnet shaft 170 in use in receptacle 141 is also generally hexagonal, has an end with a slot 172 extending above mounting ring 80, has its other end 174 extending into the hole at the bottom of the receptacle 141, and has a pair of spaced bosses 176, 178, as shown in FIG. 5. The hole in the bottom of receptacle 141 frictionally engages the shaft 170 to prevent accidental rotation of the shaft. A pair of magnets 180, 182 are positioned on shaft 170 with their North poles on opposite sides thereof. Magnet 180 is positioned between boss 176 and the bottom of receptacle 141. A spring 181 is positioned between the bottom of receptacle 141 and magnet 180 biasing the assembly upward. Magnet 182 is supported thereabove on boss 178.

Upper mounting ring 78, illustrated particularly in FIGS. 4, 5, 6 and 9, has a generally planar upper surface 183 having a central opening 184 with an inner diameter equal to the outer diameter of the compass unit above flange 20. A lip 185 below surface 183 extends outwardly about the side and rear of the mounting ring 78. Inner and outer walls 186, 188 extend below upper ring 78 a distance equal to the height of flanges 18, 20, 25 and are supported on lower ring 80. Inner wall 186 has an inner diameter equal to the outer diameter of flanges 20, 25. Eight holes 190 are positioned about lower side of upper ring 78, positioned for alignment with the holes 128 in the lower ring 80. With the compass unit 12 mounted in position on lower ring 80, fasteners 192 (one is shown in FIG. 5) in holes 128, 190 secure the upper ring 78 in position and secure the compass unit to the lower ring 80.

Above receptacle 141 in lower ring 80, the upper ring 78 has, supported therebelow, a receptacle cover 193 having a hole therein aligned with the hole in the bottom of receptacle 141 to receive therethrough the slotted end of corrector magnet shaft 170. The cover 193 rests against magnet 182 as shown in FIG. 5 securing it in position between the cover 193 and boss 178. The hole in the cover 193, like the hole in receptacle 141, frictionally engages shaft 170 to prevent accidental rotation of the shaft, the holes being aligned on an axis to support shaft 170 on its axis normal to the equatorial plane of the compass with bottom wall 84 horizontal; with bottom wall 84 vertical, as in FIG. 14 the axis is parallel to the equatorial plane and the lubber line of the compass.

Figure 9:
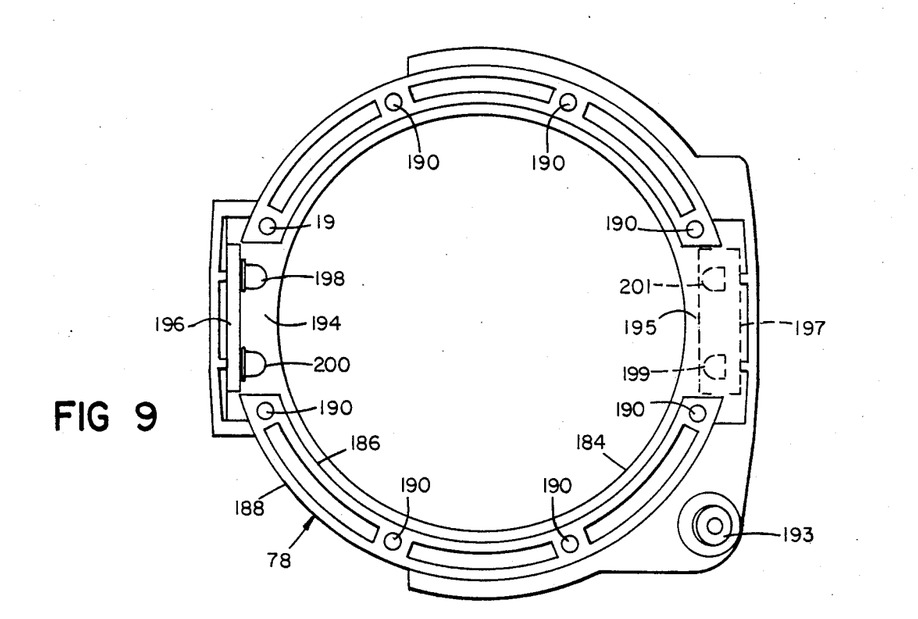
FIG. 9 is an enlarged bottom plan view of the upper mounting ring of the compass housing.
Figure 10:
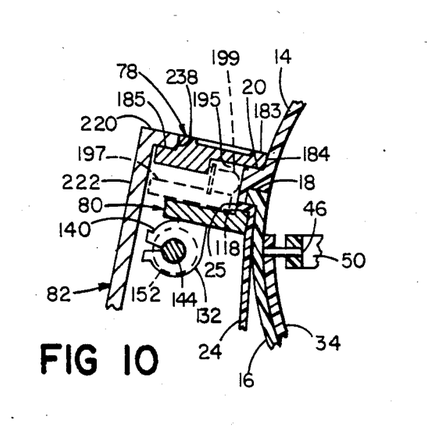
FIG. 10 is an enlarged fragmentary sectional view taken along the line 10—10 of FIG. 6.
Figure 11:
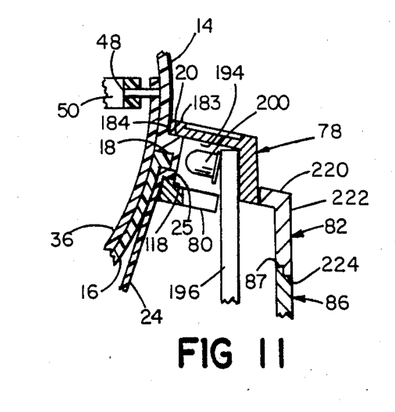
FIG. 11 is an enlarged fragmentary sectional view taken along the line 11—11 of FIG. 6.
Figure 12:
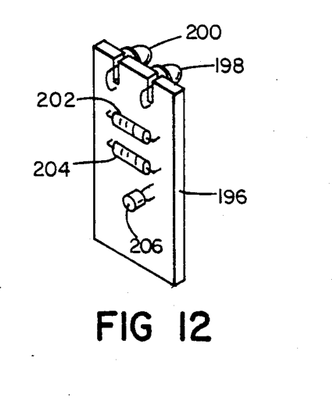
FIG. 12 is an enlarged isometric view of a circuit board and components thereon.
Figure 13:
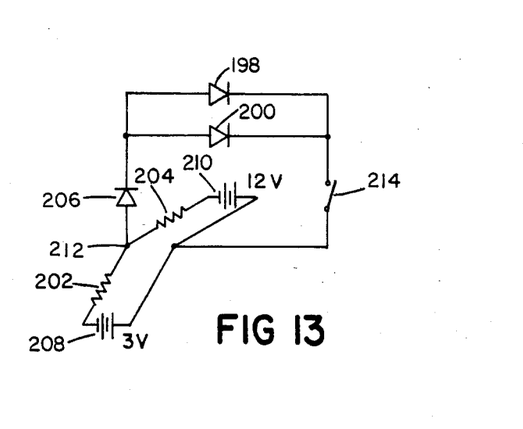
FIG. 13 is a circuit diagram of the components mounted on the board of FIG. 12 connected to batteries.

At the front and rear of the upper mounting ring 78, as shown in FIGS. 9, 10, and 11, the inner wall 186 is interrupted and the outer wall is extended outwardly to provide recesses 194, 195 to receive light sources. A circuit board 196, as shown in FIGS. 9 and 11, is positioned in the recess 194 and has mounted thereon a pair of 10 milliamp light emitting diodes (LED's) 198, 200, the LED's being positioned closely adjacent flange 20 of the compass unit 12. Also mounted on the board, best shown in FIG. 12, are current limiting resistors 202, 204 and a blocking diode 206 to prevent reverse current flow. Alternatively, as shown in broken lines in FIGS. 9 and 10 a board 197 having LED's 199, 201 may be provided in recess 195 with the other circuit components (not shown) in the housing base 76. A circuit diagram is shown in FIG. 13. As illustrated, LED's 198, 200 are connected in parallel, via rocker switch 214, either to portable batteries 208 or the vehicle electrical system battery 210. Resistors 202, 204 are in the circuit between the respective batteries 208, 210 and a common junction 212 from the main circuit to the batteries. Blocking diode 206 is positioned in the main circuit between the junction 212 and the LED's 198, 200. In the illustrated circuit, resistor 202 has a resistance of 100 ohms for use in a three volt portable battery operated circuit and resistor 204 has a resistance of 510 ohms for use in a twelve volt circuit employing the electrical system of the vehicle. Alternatively, for a six volt portable battery power supply, the resistor 202 has a resistance of 270 ohms.

Wires from the board 196 extend to the interior of the base 76 as shown in FIG. 5. If the circuit is to be connected to the vehicle electrical system, the circuit wires connected to resistor 204 may be connected to wires from the electrical system extending through a weep hole 91. Alternatively, as in the illustrated embodiment, two AA size, 1.5 volt batteries 208 may be provided one in each of two battery cases 216 located on each side in base 76, connected to the circuit wires including resistor 202. To avoid interference with the magnetic fields of the compass, plastic or paper clad, carbon batteries are employed.

Cover 82 comprises an upper wall 220 and side wall 222 extending thereabout. Sidewall 222 is recessed about its inner periphery defining a lip 224 about the outer periphery which mates with the lip 87 and recess about the periphery of side wall 86 of base 76. Inside the cover 82, side wall 222 is provided with recesses 228 mating with the lobes 92, 94 extending upwardly from base 76. Holes 232 through the cover side walls 222 are aligned with the threaded collars 96 in the lobes 92, 94. Knobs 234, 236 having threaded shafts extending through holes 232 and into collars 96 secure the cover 82 and base 76 together. Gaskets 235 are positioned between the knobs and the housing. A mounting bracket (not shown) may optionally be secured between the knobs 234, 236 and the gaskets 235. The upper wall 220 is inclined forwardly, i.e., at 12° and has an opening 238 extending about the periphery of the upper mounting ring 78, lying over and engaging lip 185 at the sides and rear of the compass. At the front of the compass upper wall 220 is reduced in height as it extends about the upper mounting ring, to a position below the equatorial plane of the compass.

The various plastic components of the compass, including the bowl portions, gimbal support and ring, frame, card, and membrane of the compass unit 12, the housing base, upper and lower mounting rings and housing cover are all injection molded. All metal components other than the permanent magnets are made of non-magnetic, non-ferous material such as brass.

After the internal components of the compass unit 12 are assembled in lower bowl 16, the upper bowl 14 is placed on the lower bowl with flanges 18, 20 contacting each other. Flange 25 of membrane 24 is positioned under flanges 18, 20. The upper and lower mounting rings 78, 80 are then mounted about the flanges 18, 20, 25 of the compass unit 12 and are secured together with self threading screw fasteners 192 extending through holes 128 in the lower ring 80 into the corresponding aligned holes 190 in the upper ring 78. The clamping pressure of rings 78, 80 seals the bowls as flange 25 is clamped against the joint between flanges 18, 20. In assembly, the compass unit lubber line is aligned with the center of the front and rear portions of the rings 78, 80. After the bowls 14, 16 are assembled with rings 78, 80, the compass unit is filled with liquid and air is evacuated through ports 26, 28; ports 26, 28 are then closed by fitting 27. After the rings are assembled, board 196 is placed and adhesively secured in recess 194 with LED's 198, 200 in close proximity to flange 20 of the compass unit.

After the rings are assembled, self threading screw fasteners 129 are screwed from below posts 100, 102, 104, 106 in the housing base into legs 120, 122, 124, 126 of the lower mounting ring 80. Magnets 154, 156, 158, 160 and springs 166, 168 may then be positioned on their respective shafts 142, 144 on the ends opposite slots 146, 148. Caps 162, 164 are pressed on the ends of the shafts 142, 144. The corrector magnet shafts 142, 144 may then be snapped into position between support arms 130, 134, 138 and 132, 136, 140. Shaft 170 with magnets 180, 182 and spring 181 thereon may be placed in receptacle 141 through the cut away wall thereof. Thereafter, cover 82 is placed in mating engagement on base 76 and knobs 234, 236 are screwed through holes 232 into collars 96 securing the cover and base together.

In use, the compass is mounted either directly to a horizontal or a vertical surface or by an optional mounting bracket (not shown) to any surface. To fasten the compass directly to a surface, knobs 234, 236 are unscrewed and cover 82 is removed from the housing thus exposing the screw holes 88, 90 in the bottom of the base 76. A screw is first placed through the align slot screw hole 88 in the rear of the base. The compass is then carefully aligned and screws placed through the screw holes 90 in the front of the base securing the housing to the surface. If necessary, due to the elongated configuration of holes 88, 90, further adjustment is possible by loosening the screws after the initial positioning. When the compass is mounted in a horizontal position care is exercised to assure that the lubber line is parallel to the centerline of the vehicle. When the compass is mounted in a vertical position the bottom of the housing base must be normal to the vehicle centerline; additionally the housing front is positioned at the top, as shown in FIG. 14, to position the LED's above the compass bowl.

Advantageously, with the cover removed, the shafts 142, 144, 170 supporting the corrector magnets, being positioned above the edge 87 of the housing base 76, are accessible for adjustment without need for removing the compass unit 12 from the housing 10. Additionally, the provision for magnets on three axes permits compensation in either a horizontal or vertical orientation of the compass.

In use, only two corrector magnet shafts and two sets of magnets are employed depending on whether the compass is mounted to a horizontal or a vertical surface. Shaft 144 extending at a right angle to the lubber line, parallel to the equatorial plane and magnets 158, 160 thereon is utilized in each orientation of the compass. With the compass mounted to a horizontal surface, shaft 142, parallel to the lubber line and the equatorial plane, and magnets 154, 156 are also utilized. Shaft 170 and magnets 180, 182 are not mounted to the receptacle 141 or, if already in place, are removed. Shafts 142, 144 and magnets 154, 156, 158, 160 are rotated by a non-magnetic screw driver engaged in the slots 146, 148 in the ends of the shafts to compensate local magnetic fields in the normal manner.

Figure 14:
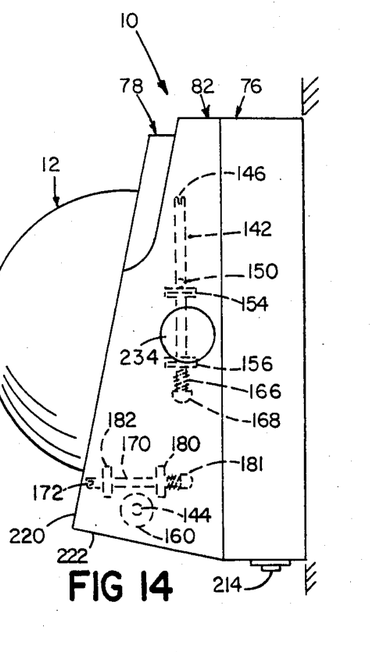
FIG. 14 is a side elevation view of the compass mounted in a vertical orientation.

With the compass mounted to a vertical surface as shown in FIG. 14 the rear shaft 144, which remains transverse of the lubber line and parallel to the equatorial plane, and magnets 158, 160 are again utilized. Shaft 142 and magnets 154, 156, however are not mounted or are removed. Instead, shaft 170 and magnets 180, 182 are positioned in receptacle 141, the axis of shaft 170 being parallel to the lubber line and the equatorial plane with the compass mounted to a vertical surface. The compass unit is again compensated in the usual manner by rotation of shafts 142, 170 and the magnets thereon.

The angular orientation of the mounting rings 78, 80 gripping the flanges 18, 20 of the compass bowl portions 14, 16 and the angular orientation of the housing cover, result in exposure at the front of the compass of the interior of the compass unit 12 below the pivot bearing 60 and the equatorial plane when the housing base 76 is mounted horizontally. Thus, a direct read card 68 may be supported at pivot 60 at the equatorial plane, as illustrated, and may be extended below the plane at the periphery of the card to balance the mass of the card assembly at or below the plane. The arrangement of the mounting rings 78, 80 and cover 82 below the equatorial plane at the front permits viewing the card without obstruction.

The angular orientation of the mounting rings 78, 80 and the cover 82 also permits the use of front lighting for the direct read card 68, LED's 198, 200 positioned adjacent flange 20 at the front of the compass unit 12. The provision of a recess at the back of the rings also permits back lighting if desired. The flanges 18, 20 aid in diffusing light within the compass. The use of low power consumption LED's 198, 200 as the light source additionally permits the use of portable batteries 214 in the housing as a power source for the lighting.

Other embodiments of the invention will occur to those skilled in the art which are within the scope of the following claims. Thus a flat card reading from the rear may be used instead of a front facing direct read card. LED's 199, 201 may be provided in recess 195 for use with the flat card in either a horizontal or vertical orientation of the housing or with a direct read card in a vertical orientation of the housing. With LED's in recess 195, in a vertical orientation the compass is inverted from the position shown in FIG. 14 to place the LED's above the card.

What is claimed is:

1. A magnetic compass comprising a compass unit, adjustable corrector magnets and a housing in which said compass unit and said corrector magnets are mounted;

said compass unit comprising a compass bowl, a gimbal mount within said bowl, and, pivotally supported within said bowl by said gimbal mount, a card assembly comprising a compass card and a magnet;

said housing comprising a base, a cover removably attached to said base enclosing said corrector magnets and a portion of said bowl, support means connecting said corrector magnets to said base above the bottom thereof, said support means adapted to support corrector magnets on at least two axes parallel to the equatorial plane of said compass with said base in a horizontal or a vertical orientation, and connecting means connecting said compass unit to said base, a portion of said compass bowl extending through an opening in said cover for viewing said compass card;

the improvement characterized in that:

said support means, with said base in a horizontal orientation, support said corrector magnets in positions beside said bowl and above at least portions of the sides of said base, said corrector magnets thereby being exposed above said sides with said cover removed and being accessible for adjustment without moving said compass.

2. The compass claimed in claim 1 further characterized in that said support means are located and adapted for adjustably rotatably supporting said corrector magnets within said housing on three axes, with the poles of said corrector magnets extending transversely of their respective said axes, a first axis parallel to the lubber line and the equatorial plane of the compass with said base in a horizontal orientation, a second axis normal to said lubber line and parallel to the equatorial plane of the compass and a third axis normal to the equatorial plane of said compass with said base in a horizontal orientation and parallel to the lubber line and the equatorial plane with said base in a vertical orientation.

3. The compass claimed in claim 2 further characterized in that said corrector magnets are mounted in said support means on two of said three axes, on said second axis and on the one of said first and third axes parallel to the lubber line and the equatorial plane in the predetermined horizontal or vertical orientation of the compass base.

4. The compass claimed in claim 3 in which said corrector magnets comprise two magnets on each of said two axes.

5. The compass claimed in claim 3 further characterized in that said means connecting said compass unit to said base extends above the equatorial plane of said compass on one side at said second axis and said cover and said means connecting said compass unit to said base, on the other side of said compass unit, opposite said one side and said second axis, are positioned below, and said compass bowl is exposed on said other side below, the position of said connecting means on said one side, for viewing said card on said other side below the position of said connecting means on said one side.

6. The compass claimed in claim 5 further characterized in that said compass card is a direct read card facing outwardly and extending downwardly at the periphery thereof to a position below said connecting means at said one side and at or above said cover and said connecting means at said other side.

7. The compass claimed in claim 6 further characterized in that said cover and said connecting means at said one side are above and at said other side are below said equatorial plane and said card extends to a position below said equatorial plane.

8. The compass claimed in claim 7 further characterized in that said compass card assembly is supported on a pivot bearing positioned on the equatorial plane of said compass, said pivot bearing supported by said gimbal mount.

9. The compass claimed in claim 8 further characterized in that the mass of said compass card assembly below said plane is at least as great as the mass of said compass card above said plane.

10. The compass claimed in claim 1 further characterized in that, on one side of the compass, said means connecting said compass unit to said base extends above said equatorial plane, and said connecting means and said cover on the other side, opposite said one side, are positioned below the position of said connecting means on said one side and said bowl is exposed on said other side for viewing below the position of said connecting means said one side.

11. The compass claimed in claim 10 further characterized in that said compass card is a direct read card facing outwardly and extending downwardly at the periphery thereof to a position below said cover at said one side and at or above said cover at said other side.

12. The compass claimed in claim 11 further characterized in that said cover and said connecting means at said one side are above and at said other side are below said equatorial plane and said card extends to a position below said equatorial plane.

13. The compass claimed in claim 12 further characterized in that said compass card assembly is supported on a pivot bearing positioned on the equatorial plane of said compass, said pivot bearing supported by said gimbal mount.

14. The compass claimed in claim 13 further characterized in that the mass of said compass card assembly below said plane is at least as great as the mass of said compass card above said plane.

15. The compass claimed in claim 10 further characterized in that a light source is provided in said housing below said the exposed portion of said bowl on said other side of said compass housing.

16. The compass claimed in claim 15 further characterized in that said light source comprises at least one light emitting diode.

17. The compass claimed in claim 16 further characterized in that said light source is connected to a power source within said housing.

18. The compass claimed in claim 17 further characterized in that said power source comprises at least one carbon battery clad in non-magnetic material.

19. The compass claimed in claim 11 further characterized in that a light source is provided in said housing on said other side thereof below said compass card.

20. The compass claimed in claim 19 further characterized in that said light source comprises at least one light emitting diode.

21. The compass claimed in claim 20 further characterized in that said light source is connected to a power source within said housing.

22. The compass claimed in claim 21 further characterized in that said power source comprises at least one carbon battery clad in non-magnetic material.

23. The compass claimed in claim 1 further characterized in that said compass bowl has a flange extending outwardly therefrom, said means connecting said compass unit to said base comprises upper and lower mounting rings, said flange positioned between said rings and said rings fastened together, said lower ring supported on and connected to said base and extending thereabove supporting said compass bowl above the bottom of said base, and one of said rings supporting said support means and corrector magnets above said base.

24. The compass claimed in claim 25 further characterized in that said cover, and said rings connecting said compass unit to said base on one side are positioned above and on the other, opposite side are positioned below the equatorial plane of said compass and said bowl is exposed on said other side from below said plane.

25. The compass claimed in claim 24 further characterized in that said flange is supported by said rings at an angle to the bottom of said base with said flange on said other side positioned below said plane.

26. The compass claimed in claim 25 further characterized in that a light source is provided in said housing adjacent said flange on said other side.

27. The compass claimed in claim 26 further characterized in that said light source is positioned in a recess, on said other side, between said rings.

28. The compass claimed in claim 25 further characterized in that recesses are provided between said rings on said one side and on said other side for receiving a light source, selectively, in one of said recesses.

29. A magnetic compass comprising a compass unit, and a housing in which said compass unit is mounted;
said compass unit comprising a compass bowl, a gimbal mount within said bowl, a pivot bearing supported by said gimbal mount, and, pivotally supported on said pivot bearing within said bowl, a card assembly comprising a compass card and a magnet;
said housing comprising a base, a cover and means connecting said compass unit to said housing, a portion of said compass bowl extending through said cover for viewing said compass card;
the improvement characterized in that:
with said base in a horizontal orientation, said means connecting said compass unit to said housing on one side of said compass unit is positioned above said pivot bearing and said connecting means and said cover on the other side of said housing are positioned below said pivot bearing exposing said bowl on said other side from below said pivot bearing for viewing said bowl and said card.

30. The compass claimed in claim 29 further characterized in that said compass card is a direct read card facing outwardly and extending downwardly at the periphery thereof from above to below said pivot bearing.

31. The compass claimed in claim 30 further characterized in that a light source is positioned within said housing on said other side for lighting said card from below said pivot bearing.

32. The compass claimed in claim 30 further characterized in that said pivot bearing is positioned on the equatorial plane of said compass.

33. The compass claimed in claim 32 further characterized in that the mass of said card assembly below said pivot bearing and said equatorial plane is at least as great as the mass of said card assembly thereabove.

34. The compass claimed in claim 32 further characterized in that a light source is positioned within said housing on said other side for lighting said card from below said pivot bearing.

* * * * *